United States Patent
Jotwani et al.

(10) Patent No.: US 12,340,554 B1
(45) Date of Patent: Jun. 24, 2025

(54) TRIGGERING PRESENTATION OF AN OBJECT BASED ON SALIENCY

(71) Applicant: Apple Inc., Cupertino, CA (US)

(72) Inventors: Payal Jotwani, Santa Clara, CA (US); Dan Feng, Santa Clara, CA (US); Bo Morgan, Emerald Hills, CA (US); Siva Chandra Mouli Sivapurapu, Santa Clara, CA (US); Mu Qiao, Campbell, CA (US); Behrooz Mahasseni, San Jose, CA (US); Mark E. Drummond, Palo Alto, CA (US)

(73) Assignee: APPLE INC., Cupertino, CA (US)

( * ) Notice: Subject to any disclaimer, the term of this patent is extended or adjusted under 35 U.S.C. 154(b) by 535 days.

(21) Appl. No.: 17/709,987

(22) Filed: Mar. 31, 2022

Related U.S. Application Data

(60) Provisional application No. 63/175,898, filed on Apr. 16, 2021.

(51) Int. Cl.
*G06V 10/46* (2022.01)
*G06V 10/22* (2022.01)

(52) U.S. Cl.
CPC .......... *G06V 10/462* (2022.01); *G06V 10/235* (2022.01)

(58) Field of Classification Search
CPC .................... G06V 10/462; G06V 10/235
See application file for complete search history.

(56) References Cited

U.S. PATENT DOCUMENTS

| | | | | |
|---|---|---|---|---|
| 8,218,895 | B1 * | 7/2012 | Gleicher | G06T 3/053 348/556 |
| 8,989,437 | B2 | 3/2015 | Wei et al. | |
| 9,454,712 | B2 | 9/2016 | Lin et al. | |
| 10,657,409 | B2 | 5/2020 | Piekniewski et al. | |
| 11,295,483 | B1 * | 4/2022 | Krishnamoorthy | G06V 20/20 |
| 11,537,506 | B1 * | 12/2022 | Dasgupta | G06F 11/1476 |
| 11,869,144 | B1 * | 1/2024 | Jotwani | G06V 10/462 |
| 2005/0286739 | A1 * | 12/2005 | Pilu | G06T 11/206 382/103 |
| 2006/0256134 | A1 * | 11/2006 | Widdowson | G06T 11/60 345/629 |
| 2009/0112287 | A1 * | 4/2009 | Greenberg | A61N 1/36046 607/54 |

(Continued)

OTHER PUBLICATIONS

Simone Frintrip et al., "Saliency-based Object Recognition in 3D Data," 2004 IEEE/RSJ International Conference on Intelligent Robots and Systems (IROS)(IEEE Cat. No. 04CH37566). vol. 3. IEEE, 2004, pp. 1-6.

*Primary Examiner* — Aaron W Carter

(74) *Attorney, Agent, or Firm* — Fernando & Partners, LLP

(57) ABSTRACT

In some implementations, a device includes one or more processors and a non-transitory memory. In some implementations, a method includes obtaining an object that includes a plurality of portions including a first portion and a second portion. In some implementations, the method includes determining a first saliency value for the first portion of the object and a second saliency value for the second portion of the object. In some implementations, the method includes triggering presentation of the first portion of the object in accordance with a first display characteristic that is based on the first saliency value and the second portion of the object in accordance with a second display characteristic that is based on the second saliency value.

22 Claims, 8 Drawing Sheets

(56) References Cited

U.S. PATENT DOCUMENTS

| | | | | |
|---|---|---|---|---|
| 2012/0275701 | A1* | 11/2012 | Park | G06T 7/11 |
| | | | | 382/173 |
| 2014/0071168 | A1* | 3/2014 | Berglund | G06T 11/60 |
| | | | | 345/660 |
| 2014/0307971 | A1* | 10/2014 | Hanzawa | G06T 3/4053 |
| | | | | 382/195 |
| 2015/0117784 | A1* | 4/2015 | Lin | G06T 11/60 |
| | | | | 382/195 |
| 2015/0248872 | A1* | 9/2015 | Fleureau | H05B 47/155 |
| | | | | 345/595 |
| 2016/0005176 | A1* | 1/2016 | Nguyen | G06F 3/013 |
| | | | | 382/103 |
| 2017/0372162 | A1* | 12/2017 | Wang | G06T 7/11 |
| 2018/0293775 | A1* | 10/2018 | Janas | G06T 13/80 |
| 2018/0300583 | A1* | 10/2018 | Peng | G06V 20/30 |
| 2018/0300848 | A1* | 10/2018 | Kuzyakov | G06V 20/30 |
| 2018/0302590 | A1* | 10/2018 | Kuzyakov | G06V 10/25 |
| 2018/0302591 | A1* | 10/2018 | Pio | H04N 13/366 |
| 2019/0251707 | A1* | 8/2019 | Gupta | G06T 9/002 |
| 2019/0340462 | A1* | 11/2019 | Pao | G06V 10/82 |
| 2019/0347501 | A1* | 11/2019 | Kim | G06F 18/2163 |
| 2021/0035264 | A1* | 2/2021 | Li | G02B 27/017 |
| 2022/0092332 | A1* | 3/2022 | Kuzyakov | G06V 20/20 |
| 2022/0197384 | A1* | 6/2022 | Goldberg | G06F 3/167 |
| 2022/0242433 | A1* | 8/2022 | Hecht | G06V 20/59 |
| 2022/0383032 | A1* | 12/2022 | Garg | G06T 7/11 |
| 2024/0242309 | A1* | 7/2024 | Shi | G06T 3/4053 |

* cited by examiner

300

TRIGGERING PRESENTATION OF AN OBJECT BASED ON SALIENCY

CROSS-REFERENCE TO RELATED APPLICATION

This application claims the benefit of U.S. Provisional Patent App. No. 63/175,898, filed on Apr. 16, 2021, which is incorporated by reference in its entirety.

TECHNICAL FIELD

The present disclosure generally relates to triggering presentation of an object based on saliency.

BACKGROUND

Some devices are capable of generating and presenting graphical environments that include many objects. These objects may mimic real world objects. These environments may be presented on mobile communication devices.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1A:
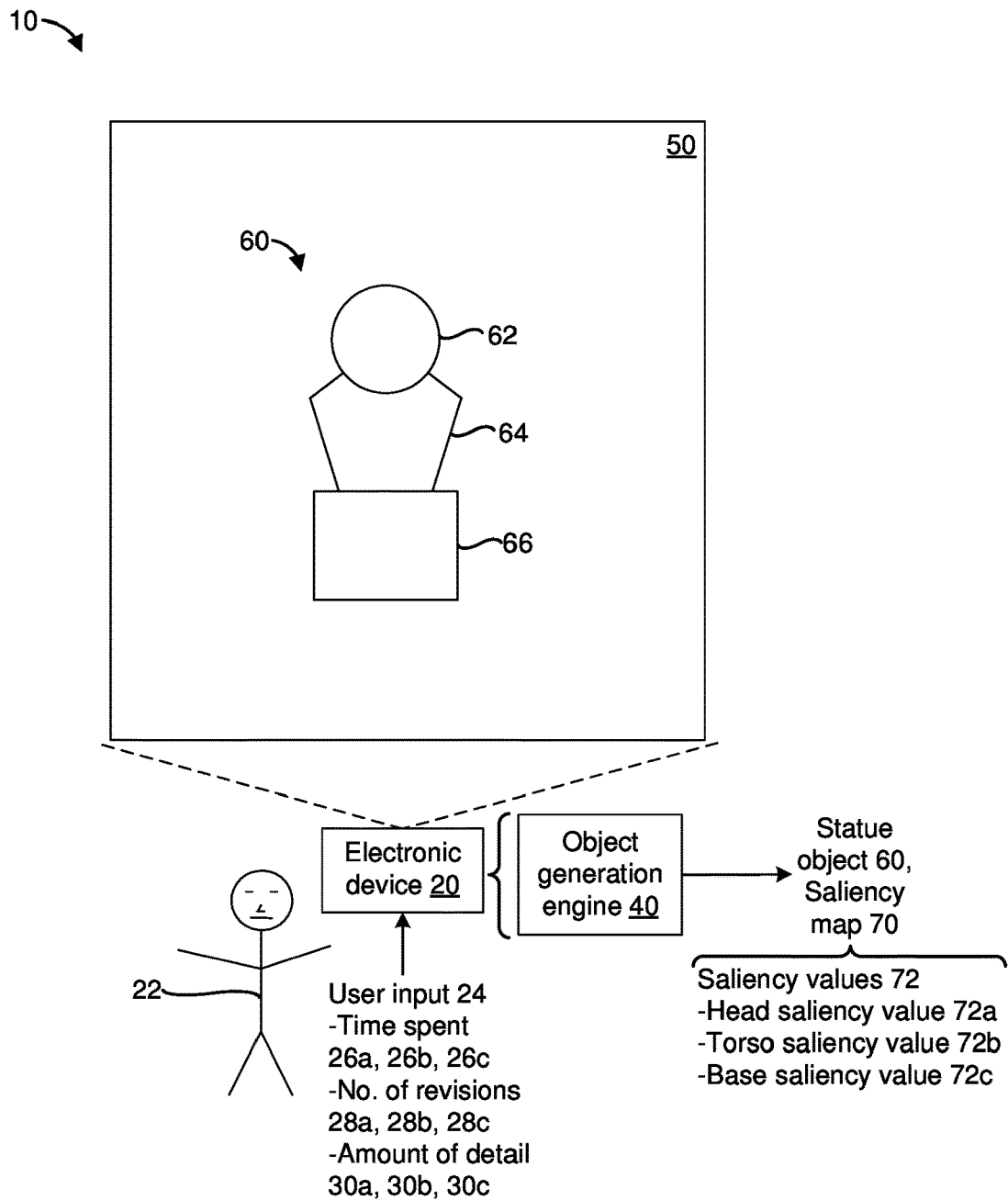
FIGS. 1A-1D are diagrams of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for generating an object based on saliency. In some implementations, a device includes one or more processors and a non-transitory memory. In some implementations, a method includes obtaining an object that includes a plurality of portions including a first portion and a second portion. In some implementations, the method includes determining a first saliency value for the first portion of the object and a second saliency value for the second portion of the object. In some implementations, the method includes triggering presentation of the first portion of the object in accordance with a first display characteristic that is based on the first saliency value and the second portion of the object in accordance with a second display characteristic that is based on the second saliency value.

In accordance with some implementations, a device includes one or more processors, a non-transitory memory, and one or more programs. In some implementations, the one or more programs are stored in the non-transitory memory and are executed by the one or more processors. In some implementations, the one or more programs include instructions for performing or causing performance of any of the methods described herein. In accordance with some implementations, a non-transitory computer readable storage medium has stored therein instructions that, when executed by one or more processors of a device, cause the device to perform or cause performance of any of the methods described herein. In accordance with some implementations, a device includes one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Content creators create various objects that are rendered in graphical environments. Certain portions of an object may be salient, whereas other portions of the object may not be salient. However, when an object is rendered, a device may render the entire object with uniform display characteristics. Treating the salient portions the same as the non-salient portions tends to detract from a user experience of the device. For example, if a display resolution or a display refresh rate needs to be lowered, the entire object is displayed with a reduced resolution or refresh rate.

The present disclosure provides methods, systems, and/or devices for generating an object that is associated with saliency values that define how the object is rendered. When a content creator is creating an object, a device associates respective saliency values with different portions of the object. The saliency values trigger presentation of the different portions of the object with respective display characteristics. For example, a first portion of the object with a first saliency value is presented at a first display resolution while a second portion of the object with a second saliency value that is lower than the first saliency value is presented at a second display resolution that is less than the first display resolution. As another example, if a refresh rate of a display is being lowered in order to conserve power, a refresh rate of a first display region that is displaying the first portion may be lowered to a lesser extent than a refresh rate of a second display region that is displaying the second portion.

The device can identify the salient portions of the object automatically, for example, without receiving a user input that specifies the saliency values. The device can determine saliency values for different portions of the object based on respective amounts of time that a content creator spent creating the portions. For example, the device can set a first saliency value for a first portion of the object to be greater than a second saliency value for a second portion of the object in response to determining that the first portion was created in a first amount of time and the second portion was created in a second amount of time that is less than the first amount of time. As another example, the device can determine that portions of the object that have been revised more than a threshold number of times are more salient than portions of the object that have not been revised or that have been revised less than the threshold number of times.

The device can determine respective saliency values for different portions of an object based on corresponding characteristic values associated with the portions of the object. For example, the device can determine respective saliency values for different portions of an object based on corresponding numbers of polygons in a texture map for the object. As an example, the device can set a first saliency value for a first portion of the object based on a first number of polygons in a first portion of a texture map that corresponds to the first portion of the object, and a second saliency value for a second portion of the object based on a second number of polygons in a second portion of the texture map that corresponds to the second portion of the object. More generally, the device can determine that portions of an object that are associated with more than a threshold number of polygons in a texture map are salient, and portions of the object that are associated with less than the threshold number of polygons are non-salient.

The device can determine respective saliency values for different portions of an object based on corresponding colors of the portions of the object. As an example, the device can set a first saliency value for a first portion of the object based on a first set of colors associated with the first portion of the object, and a second saliency value for a second portion of the object based on a second set of colors associated with the second portion of the object. More generally, the device can determine that portions of an object that utilize a first set of colors (e.g., a first number of colors, and/or a first type of colors, for example, bright colors) are salient, and portions of the object that utilize a second set of colors (e.g., a second number of colors, and/or a second type of colors, for example, grayscale or black-and-white) are non-salient.

The device can determine respective saliency values for different portions of an object based on corresponding amounts of movement that the portions of the object are capable of performing. As an example, the device can set a first saliency value for a first portion of the object based on a first amount of movement that the first portion of the object is capable of performing, and a second saliency value for a second portion of the object based on a second amount of movement that the second portion of the object is capable of performing. As another example, the device can determine that portions of an object that move are salient, and portions of the object that are stationary are non-salient.

The device can determine respective saliency values for different portions of an object based on one or more user inputs that indicate the saliency values. A user of a device (e.g., a content creator) can specify the saliency values. The content creator can identify the salient portions of the object. For example, the content creator can place pins on the salient portions of the object. The device may prompt the user to specify the salient portions of the object.

FIG. 1A is a diagram that illustrates an example physical environment 10 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the physical environment 10 includes an electronic device 20 and an object generation engine 40. In some implementations, the electronic device 20 includes a handheld computing device that can be held by a user 22. For example, in some implementations, the electronic device 20 includes a smartphone, a tablet, a media player, a laptop, or the like. In some implementations, the electronic device 20 includes a wearable computing device that can be worn by the user 22. For example, in some implementations, the electronic device 20 includes a head-mountable device (HMD) or an electronic watch.

In the example of FIG. 1A, the object generation engine 40 resides at the electronic device 20. For example, the electronic device 20 implements the object generation engine 40. In some implementations, the electronic device 20 includes a set of computer-readable instructions corresponding to the object generation engine 40. Although the object generation engine 40 is shown as being integrated into the electronic device 20, in some implementations, the object generation engine 40 is separate from the electronic device 20. For example, in some implementations, the object generation engine 40 resides at another device (e.g., at a controller, a server or a cloud computing platform).

In some implementations, the object generation engine 40 presents an object generation environment 50 that allows the user 22 to generate an object such as a statue object 60. In various implementations, an object includes various portions. In the example of FIG. 1A, the statue object 60 includes a head portion 62 (hereafter "head 62"), a torso portion 64 (hereafter "torso 64") and a base portion 66 (hereafter "base 66"). In some implementations, the object generation engine 40 generates a saliency map 70 for the statue object 60. As illustrated in FIG. 1A, in various implementations, the saliency map 70 includes a set of one or more saliency values 72 (hereafter "saliency values 72") that indicate respective saliencies of corresponding portions of the statue object 60. For example, the saliency values 72 include a head saliency value 72a that indicates a saliency of the head 62, a torso saliency value 72b that indicates a saliency of the torso 64 and a base saliency value 72c that indicates a saliency of the base 66.

In various implementations, the object generation engine 40 associates the saliency map 70 with the statue object 60. For example, in some implementations, the object generation engine 40 includes the saliency map 70 in metadata associated with the statue object 60. In some implementations, the object generation engine 40 generates procedural code that represents the statue object 60 and the saliency map 70. In various implementations, the object generation engine 40 provides (e.g., transmits) the saliency map 70 with the statue object 60.

In some implementations, the saliency values 72 indicate respective saliency levels of the corresponding portions of the statue object 60. In some implementations, the saliency values 72 indicate respective levels of user interest (e.g., estimated amounts of user interest or expected amounts of interest) in the corresponding portions of the statue object 60. For example, the head saliency value 72a indicates a first expected amount of interest of a user in viewing the head 62 of the statue object 60, the torso saliency value 72b indicates a second expected amount of interest of the user in viewing the torso 64 of the statue object 60, and the base saliency value 72c indicates a third expected amount of interest of the user in viewing the base 66 of the statue object 60.

In some implementations, the electronic device 20 and/or the object generation engine 40 determine the saliency values 72 based on a set of one or more user inputs 24 (hereafter "user input 24"). In some implementations, the user input 24 includes an explicit user input. For example, in some implementations, the user input 24 specifies the saliency values 72. In some implementations, the user input 24 includes an implicit user input. For example, in some implementations, the user input 24 includes gaze data indicating time durations for which the user 22 gazed at the portions 62, 64 and 66 of the statue object 60, and the saliency values 72a, 72b and 72c are proportional to corresponding time durations.

In some implementations, a time duration associated with the user input 24 indicates amounts of time spent on different portions of the statue object 60. For example, in some implementations, a time duration of the user input 24 indicates a first amount of time 26a that the user 22 spent in creating the head 62, a second amount of time 26b that the user 22 spent in creating the torso 64, and a third amount of time 26c that the user 22 spent in creating the base 66 of the statue object 60. In some implementations, the saliency values 72 for different portions of the statue object 60 are a function of (e.g., proportional to) corresponding amounts of time that the user 22 spent in creating the portions, for example, because the user 22 is more likely to spend more time in creating salient portions of the statue object 60 and less time in creating less salient portions of the status object 60. For example, in some implementations, the head saliency value 72a is a function of the first amount of time 26a that the user 22 spent in creating the head 62, the torso saliency value 72b is a function of the second amount of time 26b that the user 22 spent in creating the torso 64, and the base saliency value 72c is a function of the third amount of time 26c that the user 22 spent in creating the base 66.

In some implementations, a number of instances of the user input 24 indicates numbers of revisions made to different portions of the statue object 60. For example, in some implementations, a number of instances of the user input 24 indicates a first number of revisions 28a that the user 22 made to the head 62, a second number of revisions 28b that the user 22 made to the torso 64, and a third number of revisions 28c that the user 22 made to the base 66 of the statue object 60. In some implementations, the saliency values 72 for different portions of the statue object 60 are a function of (e.g., proportional to) corresponding numbers of revisions that the user 22 made to the portions, for example, because the user 22 is more likely to spend more time in revising more salient portions of the statue object 60 and less time in revising less salient portions of the statue object 60. For example, in some implementations, the head saliency value 72a is a function of the first number of revisions 28a that the user 22 made to the head 62, the torso saliency value 72b is a function of the second number of revisions 28b that the user 22 made to the torso 64, and the base saliency value 72c is a function of the third number of revisions 28c that the user 22 made to the base 66.

In some implementations, a time duration associated with the user input 24 and/or a number of instances of the user input 24 indicate amounts of detail (e.g., a number of features, for example, a number of colors) that the user 22 incorporated into different portions of the statue object 60. For example, in some implementations, a time duration associated with the user input 24 and/or a number of instances of the user input 24 indicate a first amount of detail 30a that the user 22 incorporated into the head 62, a second amount of detail 30b that the user 22 incorporated into the torso 64, and a third amount of detail 30c that the user 22 incorporated into the base 66 of the statue object 60. In some implementations, the saliency values 72 for different portions of the statue object 60 are a function of (e.g., proportional to) corresponding amounts of detail that the user 22 incorporated into the portions, for example, because the user 22 is more likely to incorporate more detail into more salient portions of the statue object 60 and less detail into less salient portions of the statue object 60. For example, in some implementations, the head saliency value 72a is a function of the first amount of detail 30a that the user 22 incorporated into the head 62, the torso saliency value 72b is a function of the second amount of detail 30b that the user 22 incorporated into the torso 64, and the base saliency value 72c is a function of the third amount of detail 30c that the user 22 incorporated into the base 66.

Figure 1B:
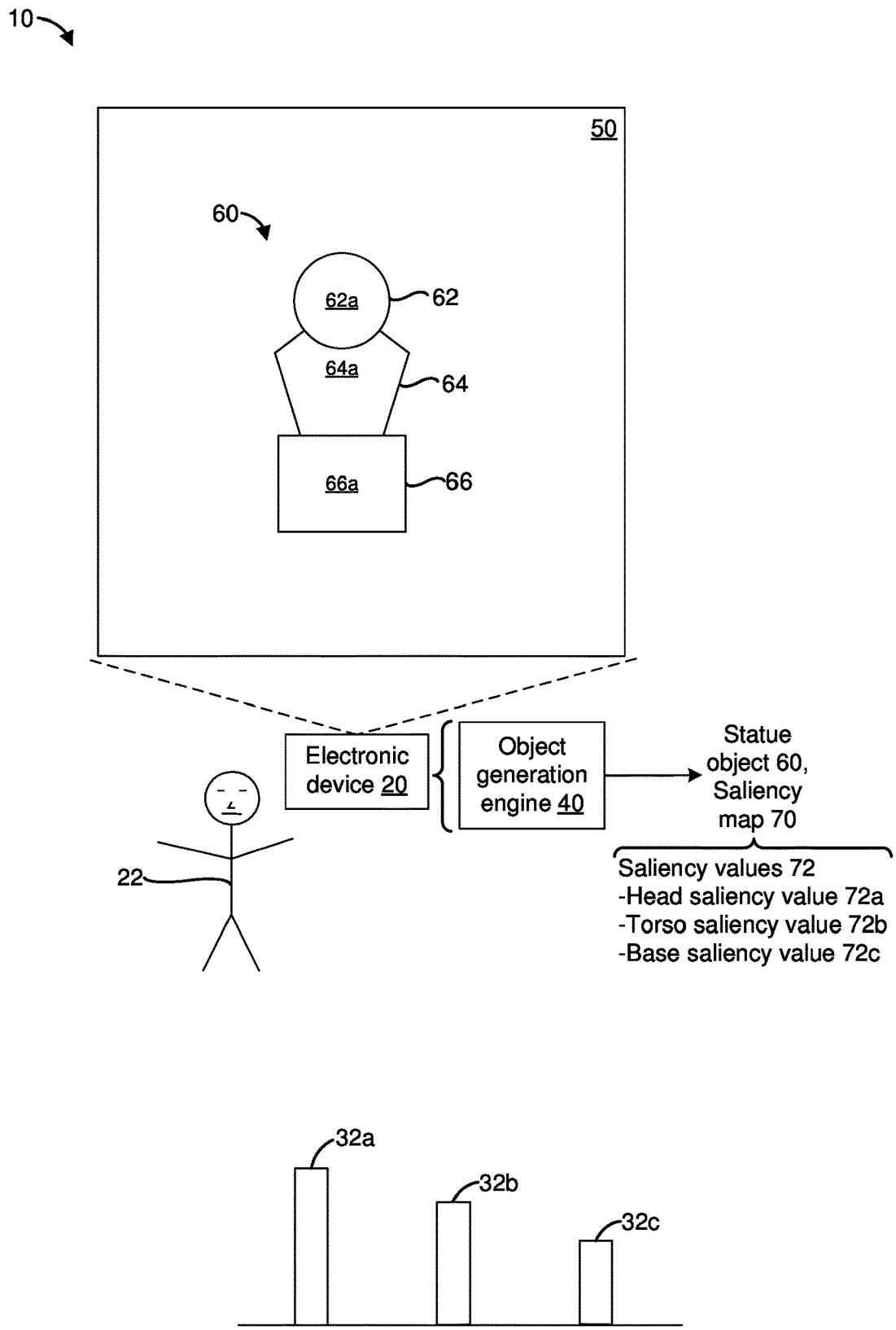

Referring to FIG. 1B, in some implementations, the electronic device 20 and/or the object generation engine 40 determine the saliency values 72 based on characteristic values that indicate characteristics of different portions of the statue object 60. In some implementations, the characteristic values indicate visual characteristics such as dimensions, color, etc. In some implementations, the characteristic values indicate material characteristics such as material type, texture, etc. In some implementations, the characteristic values indicate qualitative characteristics such as pixel density, polygon density in a texture map, etc. In some implementations, the characteristic values indicate quantitative characteristics such as when a portion of the statue object 60 was created.

In the example of FIG. 1B, the head 62 is associated with a first characteristic value 62a that indicates a characteristic of the head 62, the torso 64 is associated with a second characteristic value 62b that indicates a characteristic of the torso 64, and the base 66 is associated with a third characteristic value 66a that indicates a characteristic of the base 66. In some implementations, the head saliency value 72a is a function of the first characteristic value 62a, the torso saliency value 72b is a function of the second characteristic value 64a, and the base saliency value 72c is a function of the third characteristic value 66a.

In some implementations, the saliency values 72 are a function of respective amounts of computing resources associated with the portions of the statue object 60. In some implementations, the amounts of computing resources indicate amounts of computing resources that were utilized to generate the portions. For example, as shown in FIG. 1B, in some implementations, a first amount of computing resources 32a was utilized to generate the head 62, a second amount of computing resources 32b was utilized to generate the torso 64, and a third amount of computing resources 32c was utilized to generate the base 66. In some implementations, the saliency values 72a, 72b and 72c are a function of (e.g., proportional to) the amounts of computing resources 32a, 32b and 32c, respectively. As such, in the example of FIG. 1B, the head saliency value 72a may be greater than the torso saliency value 72b because the first amount of computing resources 32a is greater than the second amount of computing resources 32b, and the torso saliency value 72b may be greater than the base saliency value 72c because the second amount of computing resources 32b is greater than the third amount of computing resources 32c.

Figure 1C:
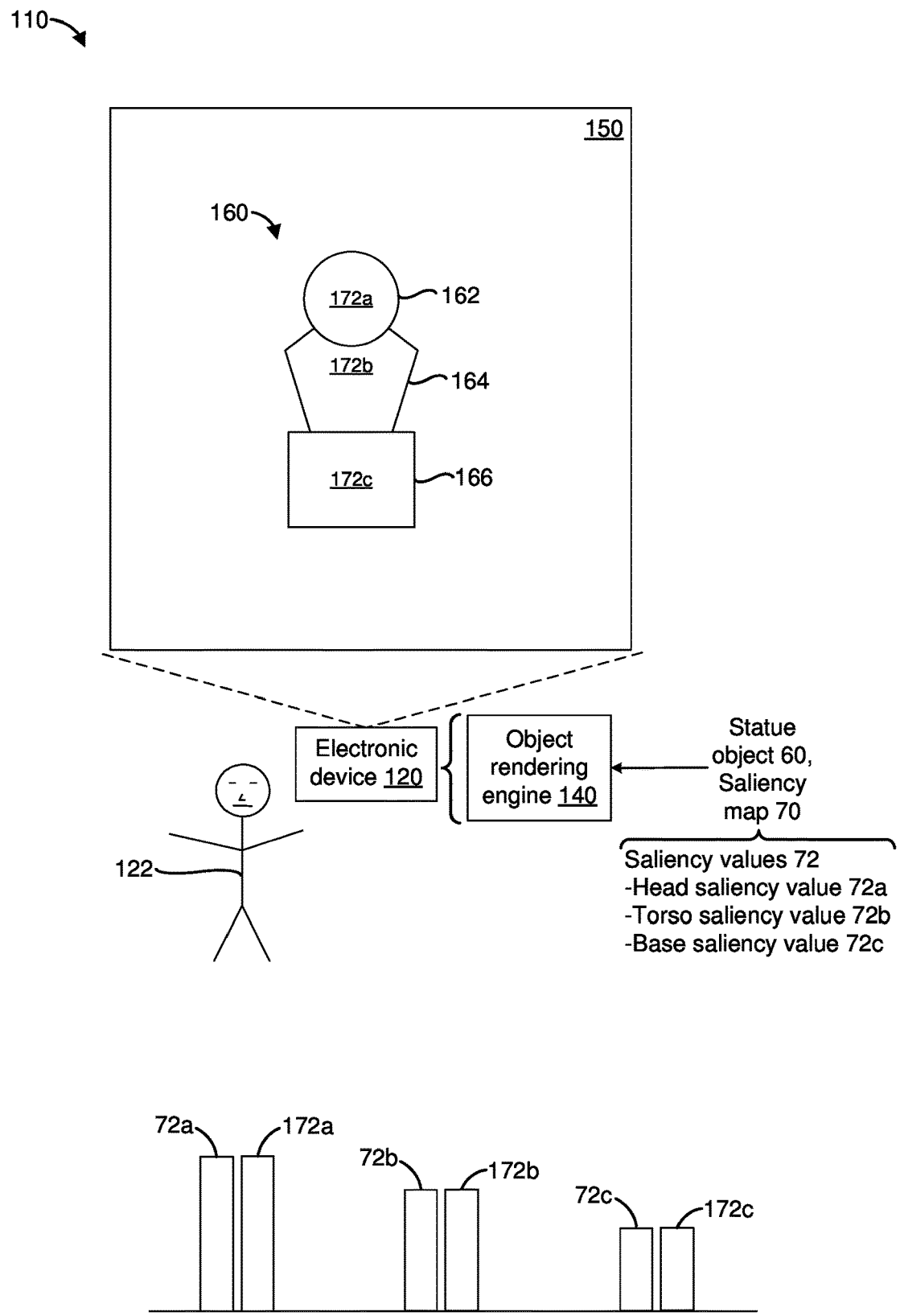

FIG. 1C illustrates a physical environment 110 that includes an electronic device 120 that is being used by a user 122 (e.g., a content viewer), and an object rendering engine 140. As shown in FIG. 1C, in some implementations, the object rendering engine 140 is integrated into the electronic device 120. Alternatively, in some implementations, the object rendering engine 140 is separate from the electronic device 120.

In various implementations, the object rendering engine 140 presents (e.g., displays) a graphical environment such as an XR environment 150. In some implementations, the electronic device 120 includes a see-through display, and the XR environment 150 includes a pass-through representation of the physical environment 110. In various implementations, the object rendering engine 140 obtains the statue object 60 and the saliency map 70, and the object rendering engine 140 utilizes the statue object 60 and the saliency map 70 to generate and present an XR statue 160 with an XR head 162, an XR torso 164 and an XR base 166. In some implementations, the XR statue 160 includes a graphical object that represents the statue object 60. As such, in some implementations, the XR statue 160 is referred to as a graphical statue.

In various implementations, the object rendering engine 140 presents (e.g., displays) different portions of the XR statue 160 with corresponding display characteristics that are based on the saliency values 72 associated with the portions. For example, as shown in FIG. 1C, the object rendering engine 140 presents the XR head 162 with a head display characteristic 172a that is a function of the head saliency value 72a, the XR torso 164 with a torso display characteristic 172b that is a function of the torso saliency value 72b, and the XR base 166 with a base display characteristic 172c that is a function of the base saliency value 72c.

In some implementations, the display characteristics 172a, 172b and 172c correspond to respective display resolutions. For example, the head display characteristic 172a corresponds to a first display resolution at which the XR head 162 is displayed, the torso display characteristic 172b corresponds to a second display resolution at which the XR torso 164 is displayed, and the base display characteristic 172c corresponds to a third display resolution at which the XR base 166 is displayed.

In some implementations, the display characteristics 172a, 172b and 172c correspond to respective refresh rates. For example, the head display characteristic 172a corresponds to a first refresh rate at which a first set of pixels displaying the XR head 162 are refreshed, the torso display characteristic 172b corresponds to a second refresh rate at which a second set of pixels displaying the XR torso 164 are refreshed, and the base display characteristic 172c corresponds to a third refresh rate at which a third set of pixels displaying the XR base 166 are refreshed.

In various implementations, the display characteristics 172a, 172b and 172c include numerical values (e.g., display resolutions and/or refresh rates) that are a function of the saliency values 72a, 72b and 72c, respectively. For example, in some implementations, the display characteristics 172a, 172b and 172c are proportional to the saliency values 72a, 72b and 72c, respectively. As illustrated in FIG. 1C, in some implementations, the head display characteristic 172a is greater than the torso display characteristic 172b because the head saliency value 72a is greater than the torso saliency value 72b, and the torso display characteristic 172b is greater than the base display characteristic 172c because the torso saliency value 72b is greater than the base saliency value 72c.

Figure 1D:
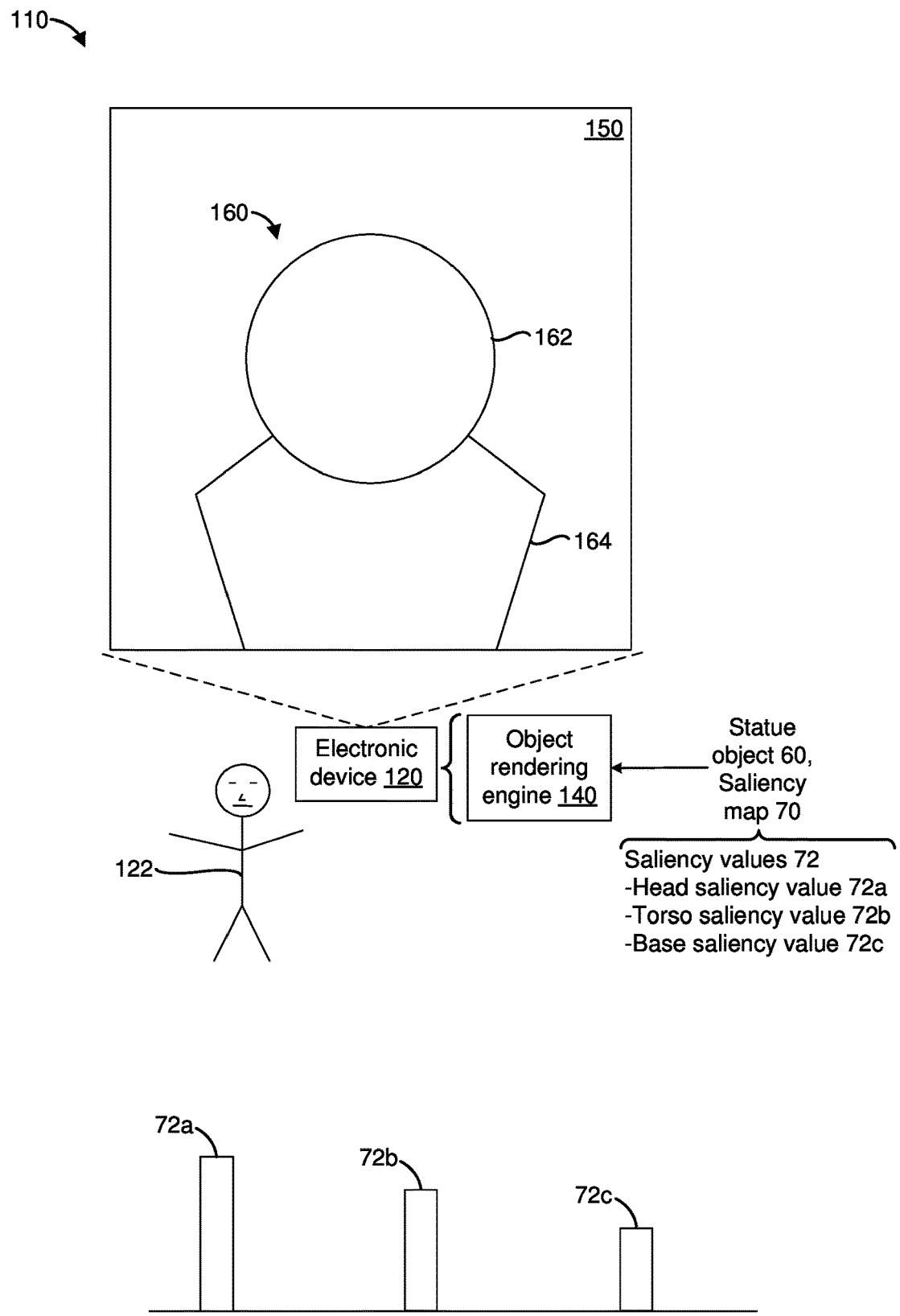

Referring to FIG. 1D, in some implementations, the object rendering engine 140 selects a point-of-view (POV) for presenting the XR statue 160 based on the saliency values 72. In the example of FIG. 1D, the object rendering engine 140 is presenting the XR statue 160 from a POV in which an entirety of the XR head 162 is visible because the head saliency value 72a is the greatest among the saliency values 72, none of the XR base 166 is visible because the base saliency value 72c is the smallest among the saliency values 72, and a portion of the XR torso 164 is visible because the torso saliency value 72b is between the head saliency value 72a and the base saliency value 72c. In some implementations, the object rendering engine 140 selects a POV that primarily provides a view of a portion of the XR statue 160 with the highest saliency value and does not provide a view of another portion of the XR statue 160 with the lowest saliency value. In some implementations, the object rendering engine 140 selects a POV that provides a complete view of portions with saliency values that are greater than a first threshold (e.g., the XR head 162), a partial view of portions with saliency values that are less than the first threshold and greater than a second threshold (e.g., the XR torso 164), and no views of portions with saliency values that are less than the second threshold (e.g., the XR base 166).

In some implementations, the electronic device 120 includes or is attached to a head-mountable device (HMD) worn by the user 122. The HMD presents (e.g., displays) an XR environment (e.g., the XR environment 150 shown in FIGS. 1C and 1D) according to various implementations. In some implementations, the HMD includes an integrated display (e.g., a built-in display) that displays the XR environment. In some implementations, the HMD includes a head-mountable enclosure. In various implementations, the head-mountable enclosure includes an attachment region to which another device with a display can be attached. For example, in some implementations, the electronic device 120 can be attached to the head-mountable enclosure. In various implementations, the head-mountable enclosure is shaped to form a receptacle for receiving another device that includes a display (e.g., the electronic device 120). For example, in some implementations, the electronic device 120 slides/snaps into or otherwise attaches to the head-mountable enclosure. In some implementations, the display of the device attached to the head-mountable enclosure presents (e.g., displays) the XR environment. In various implementations, examples of the electronic device 120 include smartphones, tablets, media players, laptops, etc.

Figure 2A:
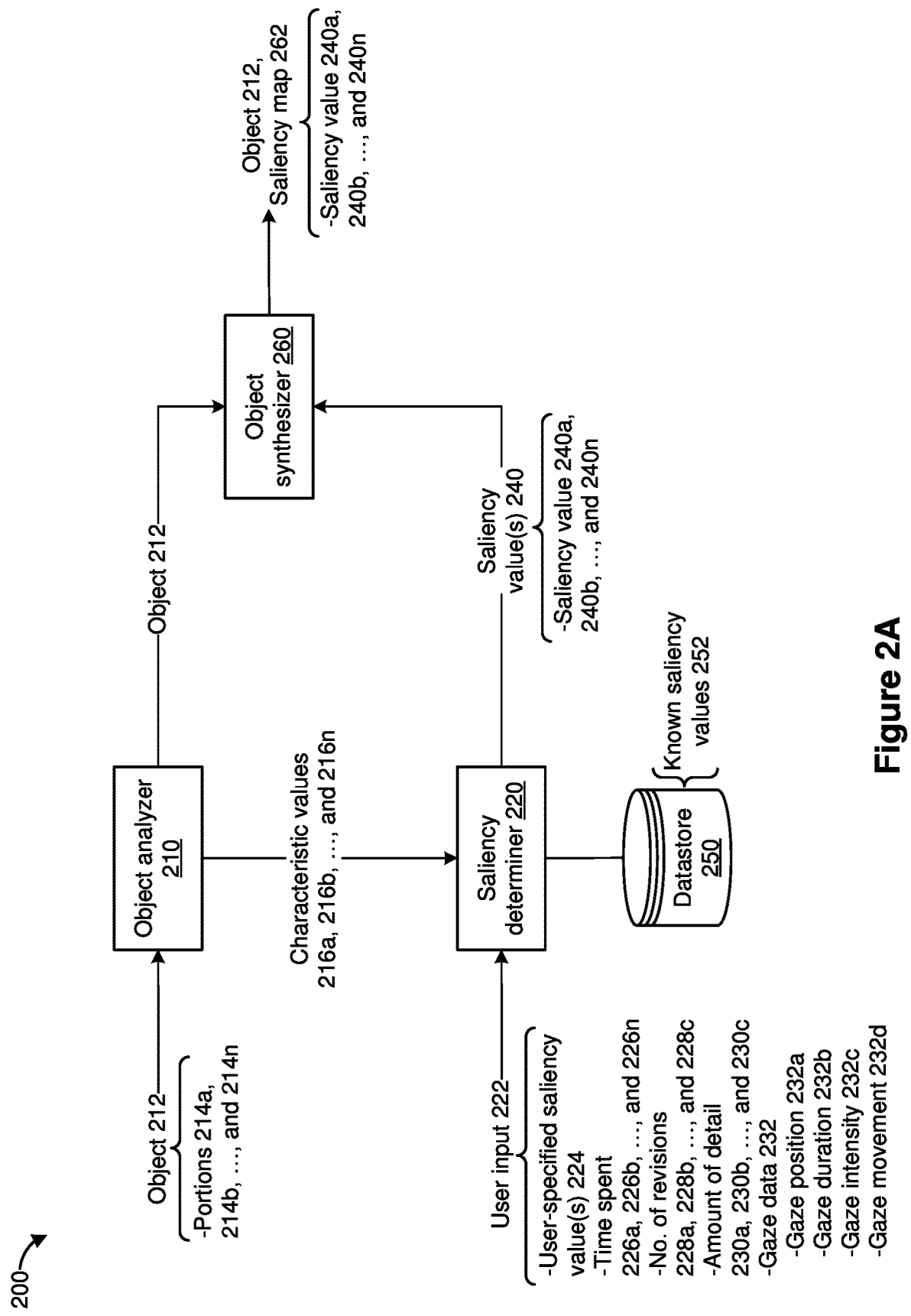
FIGS. 2A and 2B are a block diagrams of an object generation system in accordance with some implementations.

FIG. 2A illustrates a block diagram of an object generation system 200 (hereafter "system 200") in accordance with some implementations. In some implementations, the system 200 resides at the electronic device 20 and/or the object generation engine 40 shown in FIGS. 1A and 1B. In some implementations, the system 200 includes an object analyzer 210, a saliency determiner 220, a datastore 250 and an object synthesizer 260.

In various implementations, the object analyzer 210 obtains an object 212 (e.g., the statue object 60 shown in FIGS. 1A and 1B) that includes various portions (e.g., a first portion 214a, a second portion 214b, . . . , and an nth portion 214n). In some implementations, the system 200 presents a user interface (e.g., the object generation environment 50) that allows a user (e.g., a content creator, for example, the user 22 shown in FIGS. 1A and 1B) to create the object 212. In some implementations, the object analyzer 210 analyzes the object 212 while the object 212 is being created. In some implementations, the object analyzer 210 analyzes the object 212 after the object 212 has been created. In some implementations, the object analyzer 210 receives the object 212 from another device. In some implementations, the object analyzer 210 retrieves the object 212 from an object datastore that stores various objects.

In some implementations, the object analyzer 210 determines respective characteristic values that indicate characteristics of the portions 214a, 214b, . . . , and 214n of the object 212. For example, as shown in FIG. 2A, in some implementations, the object analyzer 210 determines a first characteristic value 216a that indicates a characteristic of the first portion 214a, a second characteristic value 216b that indicates a characteristic of the second portion 214b, . . . , and an nth characteristic value 216n that indicates a characteristic of the nth portion 214n.

In some implementations, the characteristic values 216a, 216b, . . . , and 216n indicate visual characteristics (e.g., dimensions, color, etc.) of the portions 214a, 214b, . . . , and 214n, respectively. In some implementations, the characteristic values 216a, 216b, . . . , and 216n indicate material characteristics (e.g., material type, texture, etc.) of the portions 214a, 214b, . . . , and 214n, respectively. In some implementations, the characteristic values 216a, 216b, . . . , and 216n indicate qualitative characteristics (e.g., pixel density, polygon density in a texture map, etc.) of the portions 214a, 214b, . . . , and 214n, respectively. In some implementations, the characteristic values 216a, 216b, . . . , and 216n indicate quantitative characteristics (e.g., when a portion of the object 212 was created) of the portions 214a, 214b, . . . , and 214n.

In various implementations, the saliency determiner 220 determines saliency values 240 (e.g., the saliency values 72 shown in FIGS. 1A-1D) for different portions of the object 212. For example, as shown in FIG. 2A, in some implementations, the saliency determiner 220 determines a first saliency value 240a for the first portion 214a, a second saliency value 240b for the second portion 214b, . . . , and an nth saliency value 240n for the nth portion 214n of the object 212.

In some implementations, the saliency determiner 220 determines the saliency values 240 based on the characteristic values 216a, 216b, . . . , and 216n provided by the object analyzer 210. In some implementations, the characteristic values 216a, 216b, . . . , and 216n indicate respective dimensions of the portions 214a, 214b, . . . , and 214n, and the saliency values 240a, 240b, . . . , and 240n are a function of (e.g., proportional to) the respective dimensions of the portions 214a, 214b, . . . , and 214n. In some implementations, the characteristic values 216a, 216b, . . . , and 216n indicate respective numbers of colors of the portions 214a, 214b, . . . , and 214n, and the saliency values 240a, 240b, . . . , and 240n are a function of (e.g., proportional to) the respective numbers of colors of the portions 214a, 214b, . . . , and 214n.

In some implementations, the characteristic values 216a, 216b, . . . , and 216n indicate respective reflectiveness (e.g., how reflective, for example, how shiny or dull) the portions 214a, 214b, . . . , and 214n are, and the saliency values 240a, 240b, . . . , and 240n are a function of (e.g., proportional to) the reflectiveness (e.g., shininess) of the portions 214a, 214b, . . . , and 214n. In some implementations, the characteristic values 216a, 216b, . . . , and 216n indicate respective densities of a feature (e.g., respective pixel densities and/or respective polygon densities in a texture map of the object 212) associated with the portions 214a, 214b, . . . , and 214n, and the saliency values 240a, 240b, . . . , and 240n are a function of (e.g., proportional to) the respective densities associated with the portions 214a, 214b, . . . , and 214n.

In some implementations, the characteristic values 216a, 216b, . . . , and 216n indicate respective ages (e.g., creation dates and/or creation times) of the portions 214a, 214b, . . . , and 214n, and the saliency values 240a, 240b, . . . , and 240n are a function of the respective ages of the portions 214a, 214b, . . . , and 214n. For example, in some implementations, the saliency values 240 for older portions of the object 212 are greater than the saliency values 240 for newer portions of the object 212, for example, because the older portions of the object 212 may represent a set of core building blocks of the object 212. Alternatively, in some implementations, the saliency values 240 for newer portions of the object 212 are greater than the saliency values 240 for older portions of the object 212, for example, because the newer portions of the object 212 may be more relevant due to their recency.

In some implementations, the saliency determiner 220 determines the saliency values 240 based on a user input 222 (e.g., the user input 24 shown in FIGS. 1A and 1B). In some implementations, the user input 222 includes a set of one or more user-specified saliency values 224 (hereafter "user-specified saliency values 224"), and the saliency determiner 220 determines the saliency values 240 based on the user-specified saliency values 224. For example, in some implementations, the saliency values 240 are within a threshold of the user-specified saliency values 224. In some implementations, the saliency values 240 are equal to the user-specified saliency values 224.

In some implementations, a time duration associated with the user input 222 indicates amounts of time spent on different portions of the object 212. For example, in some implementations, a time duration of the user input 222 indicates a first amount of time 226a that a user spent in creating the first portion 214a, a second amount of time 226b that the user 22 spent in creating the second portion 214b, . . . , and an nth amount of time 226n that the user spent in creating the nth portion 214n of the object 212. In some implementations, the saliency values 240 for different portions of the object 212 are a function of (e.g., proportional to) corresponding amounts of time that the user spent in creating the portions, for example, because the user is more likely to spend more time in creating salient portions of the object 212 and less time in creating less salient portions of the object 212. For example, in some implementations, the first saliency value 240a is a function of the first amount of time 226a that the user spent in creating the first portion 214a of the object 212, the second saliency value 240b is a function of the second amount of time 226b that the user spent in creating the second portion 214b of the object 212, . . . , and the nth saliency value 240n is a function of the nth amount of time 226n that the user spent in creating the nth portion 214n of the object 212.

In some implementations, a number of instances of the user input 222 indicates numbers of revisions made to different portions of the object 212. For example, in some implementations, a number of instances of the user input 222 indicates a first number of revisions 228a that the user made to the first portion 214a of the object 212, a second number of revisions 228b that the user made to the second portion 214b of the object 212, . . . , and an nth number of revisions 228n that the user made to the nth portion 214n of the object 212. In some implementations, the saliency values 240 for different portions of the object 212 are a function of (e.g., proportional to) corresponding numbers of revisions that the user made to the portions, for example, because the user is more likely to spend more time in revising more salient portions of the object 212 and less time in revising less salient portions of the object 212. For example, in some implementations, the first saliency value 240a is a function of the first number of revisions 228a that the user made to the first portion 214a of the object 212, the second saliency value 240b is a function of the second number of revisions 228b that the user made to the second portion 214b of the object 212, . . . , and the nth saliency value 240n is a function of the nth number of revisions 228c that the user made to the nth portion 214n of the object 212.

In some implementations, a time duration associated with the user input 222 and/or a number of instances of the user input 222 indicate amounts of detail (e.g., a number of features, for example, a number of colors) that the user incorporated into different portions of the object 212. For example, in some implementations, a time duration associated with the user input 222 and/or a number of instances of the user input 222 indicate a first amount of detail 230a that the user incorporated into the first portion 214a of the object 212, a second amount of detail 230b that the user incorporated into the second portion 214b of the object 212, . . . , and an nth amount of detail 230c that the user incorporated into the nth portion 214n of the object 212. In some implementations, the saliency values 240 for different portions of the object 212 are a function of (e.g., proportional to) corresponding amounts of detail that the user incorporated into the portions, for example, because the user is more likely to incorporate more detail into more salient portions of the object 212 and less detail into less salient portions of the object 212. For example, in some implementations, the first saliency value 240a is a function of the first amount of detail 230a that the user incorporated into the first portion 214a of the object 212, the second saliency value 240b is a function of the second amount of detail 230b that the user incorporated into the second portion 214b of the object 212, . . . , and the nth saliency value 240n is a function of the nth amount of detail 230n that the user incorporated into the nth portion 214n of the object 212.

In some implementations, the user input 222 includes an implicit user input. For example, in some implementations, the user input 222 includes gaze data 232, and the saliency determiner 220 determines the saliency values 240 based on the gaze data 232. In some implementations, the gaze data 232 indicates a gaze position 232a (e.g., pixel coordinates within the object generation environment 50 shown in FIGS. 1A and 1B), a gaze duration 232b (e.g., an amount of time for which the gaze is focused on the gaze position 232a), a gaze intensity 232c (e.g., a dimension of the gaze, for example, a number of pixels that the gaze is directed to), and/or a gaze movement 232d (e.g., a direction in which the gaze is moving). In some implementations, the saliency determiner 220 determines the saliency values 240 based on a combination of the gaze position 232a, the gaze duration 232b, the gaze intensity 232c and/or the gaze movement 232d. In some implementations, the saliency determiner 220 determines the saliency values 240 such that the saliency values 240 are a function of (e.g., proportional to) the gaze duration 232b. For example, if the gaze position 232a and the gaze duration 232b indicate that the user 22 gazed at the second portion 214b for a longer time duration than the remaining portions 214a, 214c, . . . , and 214n, the saliency determiner 220 generates the saliency values 240 such that the second saliency value 240b is greater than the remaining saliency values 240a, 240c, . . . , and 240n.

In some implementations, the saliency determiner 220 generates the saliency values 240 based on known saliency values 252 stored in the datastore 250. In some implementations, the saliency determiner 220 compares the portions 214a, 214b, . . . , and 214n of the object 212 with objects associated with the known saliency values 252. In some implementations, the saliency determiner 220 sets the saliency values 240 of the portions 214a, 214b, . . . , and 214n of the object 212 to known saliency values 252 of objects that are similar to the portions 214a, 214b, . . . , and 214n of the object 212. For example, in some implementations, the saliency determiner 220 sets the head saliency value 72a (shown in FIGS. 1A-1D) to a known saliency value 252 for a statue head.

In various implementations, the object synthesizer 260 generates a saliency map 262 (e.g., the saliency map 70 shown in FIGS. 1A-1D) that includes the saliency values 240, and the object synthesizer 260 associates the saliency map 262 with the object 212. For example, in some implementations, the object synthesizer 260 includes the saliency map 262 in metadata associated with the object 212. In some implementations, the object synthesizer 260 instantiates a data container (e.g., an HTML wrapper) and includes the object 212 and the saliency map 262 in the data container. In some implementations, the object synthesizer 260 generates procedural code that represents the object 212 and the saliency map 262. In various implementations, the object synthesizer 260 provides (e.g., transmits) the saliency map 262 with the object 212.

Figure 2B:
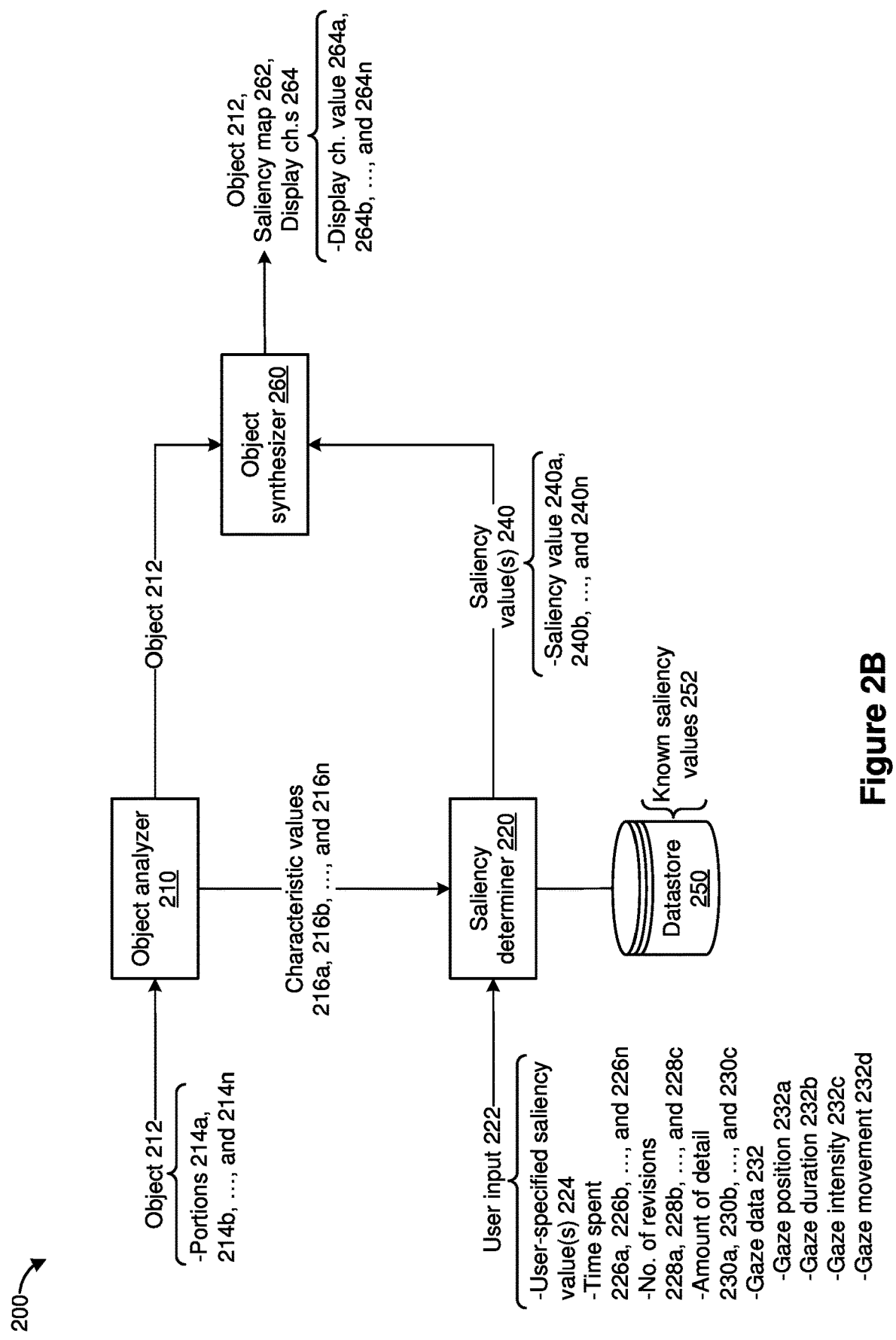

Referring to FIG. 2B, in some implementations, the object synthesizer 260 determines respective display characteristic values 264 for the portions 214a, 214b, . . . , and 214n of the object 212 based on the saliency values 240. For example, in some implementations, the object synthesizer 260 determines a first display characteristic value 264a for the first portion 214a of the object 212 based on the first saliency value 240a, a second display characteristic value 264b for the second portion 214b of the object 212 based on the second saliency value 240b, . . . , and an nth display characteristic value 264n for the nth portion 214n of the object 212 based on the nth saliency value 240n.

In various implementations, the display characteristic values 264 indicate how corresponding portions 214a, 214b, . . . , and 214n of the object 212 are to be displayed. In some implementations, the display characteristic values 264 indicate respective pixel densities for displaying the corresponding portions 214a, 214b, . . . , and 214n of the object 212. For example, the first display characteristic 264a specifies a first pixel density for displaying the first portion 214a of the object 212, the second display characteristic 264b specifies a second pixel density for displaying the second portion 214b of the object 212, . . . , and the nth display characteristic 264n specifies an nth pixel density for displaying the nth portion 214n of the object 212.

In some implementations, the display characteristic values 264 indicate respective refresh rates for display regions of a display that displays the corresponding portions 214a, 214b, . . . , and 214n of the object 212. For example, the first display characteristic 264a specifies a first refresh rate for a first display region that displays the first portion 214a of the object 212, the second display characteristic 264b specifies a second refresh rate for a second display region that displays the second portion 214b of the object 212, . . . , and the nth display characteristic 264n specifies an nth refresh rate for an nth display region that displays the nth portion 214n of the object 212.

In some implementations, the system 200 (e.g., the object synthesizer 260) transmits the object 212 and the display characteristic values 264 to another device, and the system 200 instructs the other device to display corresponding portions of the object 212 in accordance with respective ones of the display characteristic values 264. For example, the system 200 instructs a device receiving the object 212 to display the first portion 214a of the object 212 in accordance with the first display characteristic value 264a, the second portion 214b of the object 212 in accordance with the second display characteristic value 264b, . . . , and the nth portion 214n of the object 212 in accordance with the nth display characteristic value 264n.

In some implementations, the object synthesizer 260 associates the display characteristic values 264 with the object 212 in addition to associating the saliency map 262 with the object 212. Alternatively, in some implementations, the object synthesizer 260 associates the display characteristic values 264 as an alternative to associating the saliency map 262 with the object 212. In various implementations, determining the display characteristic values 264 and associating the display characteristic values 264 with the object 212 reduces a need for a device receiving the object 212 to determine the display characteristic values 264 based on the saliency values 240 included in the saliency map 262 thereby conserving computing resources at a receiving device that may be resource-constrained.

Figure 3:
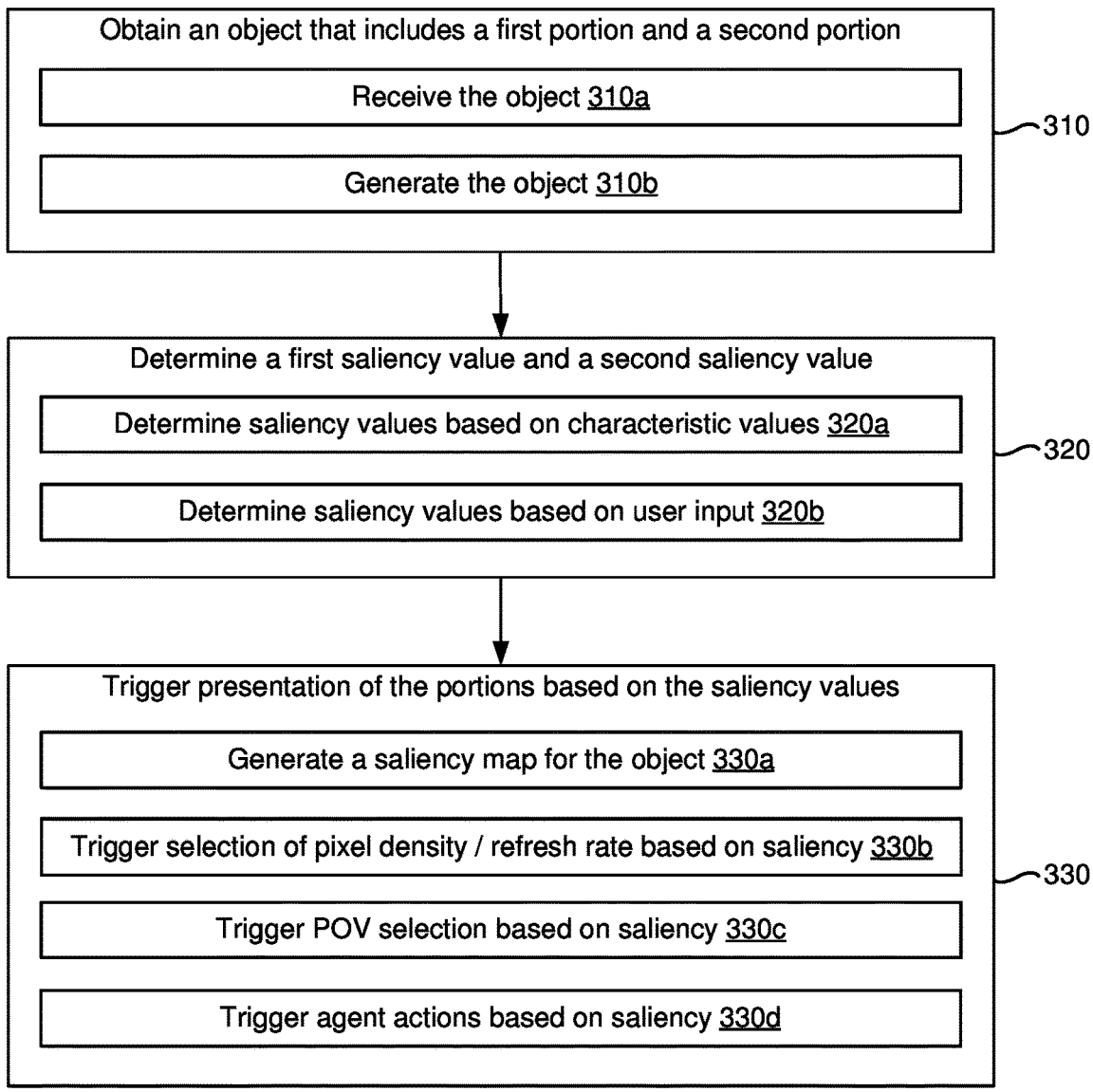
FIG. 3 is a flowchart representation of a method of generating an object in accordance with some implementations.

FIG. 3 is a flowchart representation of a method 300 for generating an object that is associated with different saliency values. In various implementations, the method 300 is performed by a device (e.g., the electronic device 20 and/or the object generation engine 40 shown in FIGS. 1A and 1B, and/or the system 200 shown in FIGS. 2A and 2B). In some implementations, the method 300 is performed by processing logic, including hardware, firmware, software, or a combination thereof. In some implementations, the method 300 is performed by a processor executing code stored in a non-transitory computer-readable medium (e.g., a memory).

As represented by block 310, in various implementations, the method 300 includes obtaining an object that includes a plurality of portions including a first portion and a second portion. For example, as shown in FIGS. 1A and 1B, the object generation engine 40 detects that the user 22 is creating the statue object 60 with the head 62, the torso 64 and the base 66. As another example, as shown in FIG. 2A, the object analyzer 210 obtains the object 212 with the portions 214a, 214b, . . . , and 214n.

As represented by block 310a, in some implementations, obtaining the object includes receiving the object. For example, as described in relation to FIG. 2A, in some implementations, the object analyzer 210 receives the object 212 from another device that created the object 212. In some implementations, the method 300 includes retrieving the object from a datastore that stores various objects. As such, in some implementations, the method 300 includes determining respective saliency values for different portions of the object after the object has been generated. For example, the method 300 includes determining a first saliency value for a first portion of the object, a second saliency value for a second portion of the object, . . . , and an nth saliency value for an nth portion of the object after the object has been generated.

As represented by block 310b, in some implementations, obtaining the object includes generating the object. For example, as shown in FIGS. 1A and 1B, in some implementations, the object generation engine 40 presents the object generation environment 50 that allows the user 22 to generate the statue object 60. As such, in some implementations, the method 300 includes determining respective saliency values for different portions of the object while the object is being generated. For example, the method 300 includes determining a first saliency value for a first portion of the object, a second saliency value for a second portion of the object, . . . , and an nth saliency value for an nth portion of the object while the object is being generated. In some implementations, the method 300 includes updating a saliency value for a previously-generated portion of the object as new portions of the object are generated.

As represented by block 320, in some implementations, the method 300 includes determining a first saliency value for the first portion of the object and a second saliency value for the second portion of the object. For example, as shown in FIGS. 1A and 1B, the object generation engine 40 determines the head saliency value 72a for the head 62 of the statue object 60, the torso saliency value 72b for the torso 64 of the statue object 60, and the base saliency value 72c for the base 66 of the statue object 60. As another example, as shown in FIGS. 2A and 2B, the saliency determiner 220 determines the first saliency value 240a for the first portion 214a of the object 212, the second saliency value 240b for the second portion 214b of the object 212, . . . , and the nth saliency value 240n for the nth portion 214n of the object 212.

As represented by block 320a, in some implementations, determining the first saliency value includes determining the first saliency value based on a first characteristic value associated with the first portion of the object and determining the second saliency value includes determining the second saliency value based on a second characteristic value associated with the second portion of the object. For example, as shown in FIG. 1B, in some implementations, the object generation engine 40 determines the head saliency value 72a based on the first characteristic value 62a associated with the head 62, the torso saliency value 72b based on the second characteristic value 62b associated with the torso 64, and the base saliency value 72c based on the third characteristic value 62c associated with the base 66. As another example, as shown in FIGS. 2A and 2B, in some implementations, the saliency determiner 220 determines the saliency values 240a, 240b, . . . , and 240n based on the characteristic values 216a, 216b, . . . , and 216n, respectively.

In some implementations, the first saliency value is a function of a first amount of resources associated with the first portion of the object and the second saliency value is a function of a second amount of resources associated with the second portion of the object. In some implementations, the second amount of resources is different from the first amount of resources. In some implementations, the first saliency value is a function of a first amount of computational resources associated with (e.g., utilized in) generating the first portion of the object and the second saliency value is a function of a second amount of computational resources associated with (e.g., utilized in) generating the second portion of the object. In some implementations, the first saliency value is a function of a first amount of computational resources associated with (e.g., expected to be utilized in) presenting the first portion of the object and the second saliency value is a function of a second amount of computational resources associated with (e.g., expected to be utilized in) presenting the second portion of the object.

In some implementations, the first saliency value is a function of a first amount of time associated with generating the first portion of the object and the second saliency value is a function of a second amount of time associated with generating the second portion of the object. For example, as described in relation to FIG. 1A, in some implementations, the head saliency value 72a is a function of the first amount of time 26a that the user 22 spent in creating the head 62, the torso saliency value 72b is a function of the second amount of time 26b that the user 22 spent in creating the torso 64, and the base saliency value 72c is a function of the third amount of time 26c that the user 22 spent in creating the base 66. As another example, as described in relation to FIGS. 2A and 2B, in some implementations, the saliency determiner 220 determines the saliency values 240a, 240b, . . . , and 240n based on the amounts of time 226a, 226b, . . . , and 226n associated with generating the portions 214a, 214b, . . . , and 214n, respectively.

In some implementations, the first saliency value is a function of a first number of polygons in a first portion of a texture map that corresponds to the first portion of the object and the second saliency value is a function of a second number of polygons in a second portion of the texture map that corresponds to the second portion of the object. For example, as described in relation to FIG. 2A, in some implementations, the characteristic values 216a, 216b, . . . , and 216n indicate respective polygon densities in a texture map of the object 212, and the saliency values 240a, 240b, . . . , and 240n are a function of (e.g., proportional to) the respective polygon densities associated with the portions 214a, 214b, . . . , and 214n.

In some implementations, the first saliency value is a function of a first level of interaction (e.g., a first level of user interaction and/or a first level of interaction by an agent) with the first portion of the object and the second saliency value is a function of a second level of interaction (e.g., a second level of user interaction and/or a second level of interaction by the agent) with the second portion of the object. In some implementations, the second level of interaction is different from the first level of interaction. In some implementations, the first saliency value is a function of a first number of revisions made to the first portion of the object and the second saliency value is a function of a second number of revisions made to the second portion of the object. For example, as described in relation to FIG. 2A, in some implementations, the saliency values 240a, 240b, . . . , and 240n are a function of the respective numbers of revisions 228a, 228b, . . . , and 228n that the user made to the corresponding portion 214a, 214b, . . . , and 214n of the object 212. In some implementations, the first saliency value is a function of a first gaze duration associated with the first portion of the object (e.g., a first amount of time during which a user gazed at the first portion of the object) and the second saliency value is a function of a second gaze duration associated with the second portion of the object (e.g., a second amount of time during which the user gazed at the second portion of the object).

In some implementations, the first saliency value is a function of a first level of detail associated with (e.g., included in) the first portion of the object and the second saliency value is a function of a second level of detail associated with (e.g., included in) the second portion of the object. In some implementations, the first saliency value is a function of a first number of colors associated with the first portion of the object and the second saliency value is a function of a second number of colors associated with the second portion of the object. For example, as described in relation to FIG. 2A, in some implementations, the amounts of detail 230a, 230b, . . . , and 230n indicate respective numbers of colors that the user incorporated in the corresponding portions 214a, 214b, . . . , and 214n, and the saliency values 240a, 240b, . . . , and 240n are a function of the respective numbers of colors incorporated into the corresponding portions 214a, 214b, . . . , and 214n of the object 212. In some implementations, the first saliency value is a function of a first resolution associated with the first portion of the object and the second saliency value is a function of a second resolution associated with the second portion of the object.

In some implementations, the first saliency value is a function of a first amount of movement that the first portion of the object is capable of performing and the second saliency value is a function of a second amount of movement that the second portion of the object is capable of performing. As an example, referring to FIG. 2A, in some implementations, the amounts of detail 230a, 230b, . . . , and 230n indicate respective amounts of movement that the corresponding portions 214a, 214b, . . . , and 214n are capable of performing, and the saliency values 240a, 240b, . . . , and 240n are a function of the respective amounts of movement that the portions 214a, 214b, . . . , and 214n are capable of performing. In some implementations, a saliency value for a dynamic portion of the object is greater than a saliency value for a static portion of the object. In some implementations, the saliency values are a function of respective amounts of dynamism of the corresponding portions of the object. For example, a saliency value for a more dynamic portion of the object is greater than a saliency value for a less dynamic portion of the object.

As represented by block 320b, in some implementations, determining the first saliency value and the second saliency value includes obtaining a user input indicative of the first saliency value or the second saliency value. In some implementations, the user input explicitly specifies the saliency values. For example, as shown in FIGS. 2A and 2B, in some implementations, the saliency determiner 220 obtains the user input 222 that indicates the user-specified saliency values 224, and the saliency determiner 220 determines the saliency values 240 based on the user-specified saliency values 224. In some implementations, the user input implicitly indicates the saliency values. For example, as shown in FIGS. 2A and 2B, in some implementations, the user input 222 indicates the amounts of time 226a, 226b, . . . , and 226n associated with generating the portions 214a, 214b, . . . , and 214n, the numbers of revisions 228a, 228b, . . . , and 228n made to the portions 214a, 214b, . . . , and 214n, the amounts of detail incorporated into the portions 214a, 214b, . . . , and 214n, and/or the gaze data 232 indicative of which of the portions 214a, 214b, . . . , and 214n the user gazed at and for how long.

As represented by block 330, in some implementations, the method 300 includes triggering presentation of the first portion of the object in accordance with a first display characteristic that is based on the first saliency value and the second portion of the object in accordance with a second display characteristic that is based on the second saliency value. For example, as shown in FIG. 1C, in some implementations, the object generation engine 40 (shown in FIGS. 1A and 1B) triggers the XR head 162 representing the head 62 of the statue object 60 to be displayed in accordance with the head display characteristic 172a, the XR torso 164 representing the torso 64 of the statue object 60 to be displayed in accordance with torso display characteristic 172b, and the XR base 166 representing the base 66 of the statue object 60 to be displayed in accordance with the base display characteristic 172c. As another example, as described in relation to FIG. 2B, in some implementations, the system 200 triggers the portions 214a, 214b, . . . , and 214n of the object 212 to be displayed in accordance with the display characteristic values 264a, 264b, . . . , and 264n, respectively.

In various implementations, displaying portions of the object in accordance with respective display characteristics that are based on corresponding saliency values tends to conserve resources (e.g., rendering resources and/or battery resources) associated with displaying the object by allocating resources based on the saliency values (e.g., by allocating more resources to display salient portions of the object and less resources to display non-salient portions of the object). In some implementations, displaying portions of the object in accordance with respective display characteristics that are based on corresponding saliency values tends to enhance a user experience of the device by utilizing more resources to display portions of the object that the user is more likely to gaze at and fewer resources to display portions of the object that the user is less likely to gaze at (e.g., by displaying salient portions at a higher resolution than non-salient portions and/or by displaying salient portions with a higher refresh rate than non-salient portions).

As represented by block 330a, in some implementations, triggering the presentation includes associating the object with a saliency map that indicates the first saliency value for the first portion of the object and the second saliency value for the second portion of the object. For example, as shown in FIGS. 2A and 2B, the object synthesizer 260 associates the object 212 with the saliency map 262 that includes the saliency values 240.

In some implementations, the object includes a plurality of pixels, and the saliency map includes respective pixel characterization vectors for the plurality of pixels. In some implementations, each pixel characterization vector includes a saliency value for a corresponding pixel. For example, a first pixel characterization vector for a first one of the plurality of pixels includes a first saliency value for the first one of the plurality of pixels, a second pixel characterization vector for a second one of the plurality of pixels includes a second saliency value for the second one of the plurality of pixels, . . . , and an nth pixel characterization vector for an nth one of the plurality of pixels includes an nth saliency value for the nth one of the plurality of pixels.

As represented by block 330b, in some implementations, triggering the presentation includes triggering display of the first portion of the object with a first pixel density that is a function of the first saliency value and the second portion of the object with a second pixel density that is a function of the second saliency value. For example, referring to FIG. 2B, in some implementations, the display characteristic values 264a, 264b, . . . , and 264n indicate respective pixel densities (e.g., respective resolutions) for the corresponding portions 214a, 214b, . . . , and 214n of the object 212.

In some implementations, triggering the presentation includes triggering display of the first portion of the object at a first refresh rate that is a function of the first saliency value and the second portion of the object at a second refresh rate that is a function of the second saliency value. For example, referring to FIG. 2B, in some implementations, the display characteristic values 264a, 264b, . . . , and 264n indicate respective refresh rates for display regions of a display that displays the corresponding portions 214a, 214b, . . . , and 214n of the object 212.

As represented by block 330c, in some implementations, triggering the presentation includes triggering display of the object from a first point-of-view (POV) that primarily focuses on the first portion of the object in response to the first saliency value being greater than the second saliency value and triggering display of the object from a second POV that primarily focuses on the second portion of the object in response to the second saliency value being greater than the first saliency value. For example, as shown in FIG. 1D, the electronic device 120 displays the XR statue 160 from a POV that shows the XR head 162 (e.g., because the head saliency value 72a is greater than a first saliency threshold and a second saliency threshold) and a portion of the XR torso 164 (e.g., because the torso saliency value 72b is between the first and second saliency thresholds) and not the XR base 166 (e.g., because the base saliency value 72c is lower than the first and second saliency thresholds).

As represented by block 330d, in some implementations, the method 300 includes triggering an agent to interact with the first portion of the object in response to the first saliency value being greater than the second saliency value. In some implementations, interacting with the first portion includes directing a gaze of the agent towards the first portion of the object. For example, referring to FIG. 1C, in some implementations, an XR representation of an agent is animated to gaze at the XR head 162 instead of the XR base 166 because the head saliency value 72a is greater than the base saliency value 72c. In some implementations, interacting with the first portion includes animating the XR representation of the agent in order to provide an appearance that the agent is touching the first portion of the object. For example, referring to FIG. 1C, in some implementations, an XR representation of an agent is animated to touch the XR head 162 instead of the XR base 166 because the head saliency value 72a is greater than the base saliency value 72c.

Figure 4:
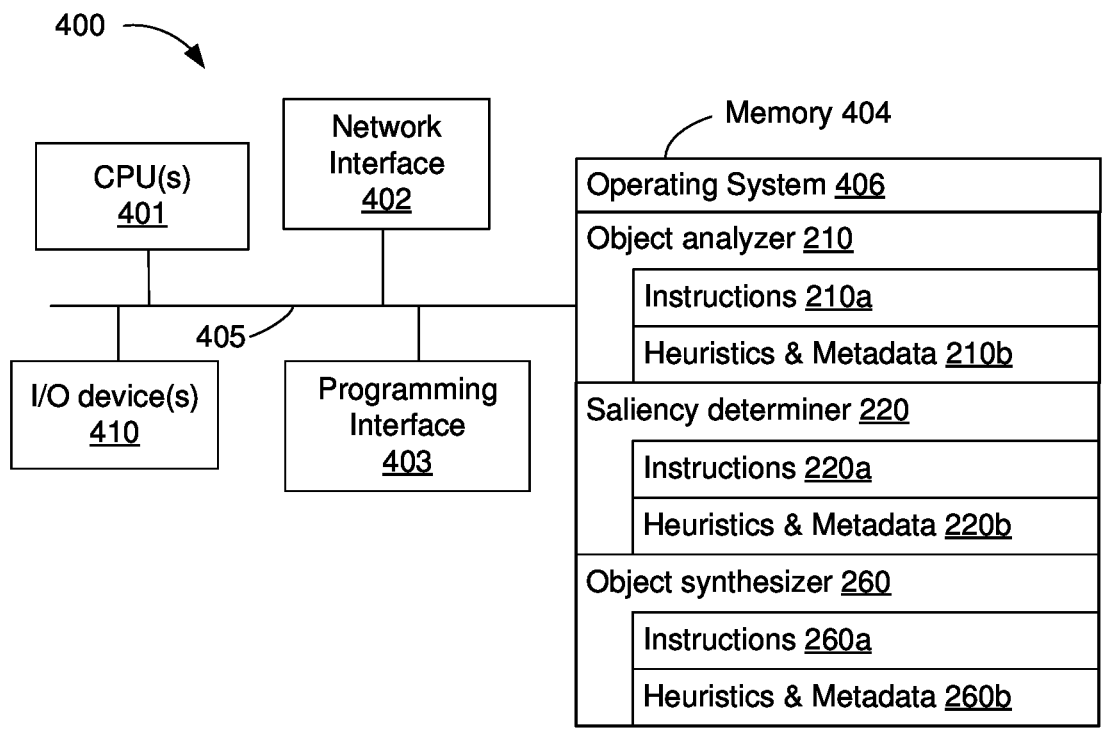
FIG. 4 is a block diagram of a device that generates an object in accordance with some implementations.

FIG. 4 is a block diagram of a device 400 in accordance with some implementations. In some implementations, the device 400 implements the electronic device 20 and/or the object generation engine 40 shown in FIGS. 1A and 1B, the electronic device 120 and/or the object rendering engine 140 shown in FIGS. 1C and 1D, and/or the system 200 shown in FIGS. 2A and 2B. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the device 400 includes one or more processing units (CPUs) 401, a network interface 402, a programming interface 403, a memory 404, one or more input/output (I/O) devices 410, and one or more communication buses 405 for interconnecting these and various other components.

In some implementations, the network interface 402 is provided to, among other uses, establish and maintain a metadata tunnel between a cloud hosted network management system and at least one private network including one or more compliant devices. In some implementations, the one or more communication buses 405 include circuitry that interconnects and controls communications between system components. The memory 404 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 404 optionally includes one or more storage devices remotely located from the one or more CPUs 401. The memory 404 comprises a non-transitory computer readable storage medium.

In some implementations, the memory 404 or the non-transitory computer readable storage medium of the memory 404 stores the following programs, modules and data structures, or a subset thereof including an optional operating system 406, the object analyzer 210, the saliency determiner 220 and the object synthesizer 260. In various implementations, the device 400 performs the method 300 shown in FIG. 3.

In some implementations, the object analyzer 210 includes instructions 210a, and heuristics and metadata 210b for obtaining an object that includes a plurality of portions including a first portion and a second portion. In some implementations, the object analyzer 210 performs at least some of the operation(s) represented by block 310 in FIG. 3.

In some implementations, the saliency determiner 220 includes instructions 220a, and heuristics and metadata 220b for determining a first saliency value for the first portion of the object and a second saliency value for the second portion of the object. In some implementations, the saliency determiner 220 performs at least some of the operation(s) represented by block 320 in FIG. 3.

In some implementations, the object synthesizer 260 instructions 260a, and heuristics and metadata 260b for triggering presentation of the first portion of the object in accordance with a first display characteristic that is based on the first saliency value and the second portion of the object in accordance with a second display characteristic that is based on the second saliency value. In some implementations, the object synthesizer 260 performs at least some of the operation(s) represented by block 330 in FIG. 3.

In some implementations, the one or more I/O devices 410 include an input device for obtaining user inputs (e.g., the user input 24 shown in FIG. 1A and/or the user input 222 shown in FIGS. 2A and 2B). In some implementations, the input device includes a touchscreen, a depth sensor (e.g., a depth camera) and/or an image sensor (e.g., a camera, for example, a visible light camera or an infrared light camera). In some implementations, the one or more I/O devices 410 include a display for displaying an object (e.g., the statue object 60 shown in FIGS. 1A and 1B, the XR statue 160 shown in FIGS. 1C and 1D, and/or the object 212 shown in FIGS. 2A and 2B).

In various implementations, the one or more I/O devices 410 include a video pass-through display which displays at least a portion of a physical environment surrounding the device 400 as an image captured by a scene camera. In various implementations, the one or more I/O devices 410 include an optical see-through display which is at least partially transparent and passes light emitted by or reflected off the physical environment.

It will be appreciated that FIG. 4 is intended as a functional description of the various features which may be present in a particular implementation as opposed to a structural schematic of the implementations described herein. As recognized by those of ordinary skill in the art, items shown separately could be combined and some items could be separated. For example, some functional blocks shown separately in FIG. 4 could be implemented as a single block, and the various functions of single functional blocks could be implemented by one or more functional blocks in various implementations. The actual number of blocks and the division of particular functions and how features are allocated among them will vary from one implementation to another and, in some implementations, depends in part on the particular combination of hardware, software, and/or firmware chosen for a particular implementation.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

What is claimed is:

1. A method comprising:
at a device including one or more processors and a non-transitory memory:
receiving a first user input directed to an object generation environment;
in response to receiving the first user input, generating an object that includes a plurality of portions including a first portion and a second portion;
determining a first saliency value for the first portion of the object and a second saliency value for the second portion of the object;
generating, based on the first and second saliency values, an extended reality (XR) environment object that represents the object, wherein the XR environment object includes a first portion associated with the first portion of the object, and wherein the XR environment object includes a second portion associated with the second portion of the object; and
triggering presentation, within an XR environment, of the first portion of the XR environment object in accordance with a first display characteristic that is based on the first saliency value and the second portion of the XR environment object in accordance with a second display characteristic that is based on the second saliency value.

2. The method of claim 1, wherein determining the first saliency value comprises determining the first saliency value based on a first characteristic value associated with the first portion of the object; and
wherein determining the second saliency value comprises determining the second saliency value based on a second characteristic value associated with the second portion of the object.

3. The method of claim 1, wherein the first saliency value is a function of a first amount of resources associated with the first portion of the object and the second saliency value is a function of a second amount of resources associated with the second portion of the object.

4. The method of claim 1, wherein the first saliency value is a function of a first amount of time associated with generating the first portion of the object and the second saliency value is a function of a second amount of time associated with generating the second portion of the object.

5. The method of claim 1, wherein the first saliency value is a function of a first amount of computational resources associated with generating the first portion of the object and the second saliency value is a function of a second amount of computational resources associated with generating the second portion of the object.

6. The method of claim 1, wherein the first saliency value is a function of a first amount of computational resources associated with presenting the first portion of the object and the second saliency value is a function of a second amount of computational resources associated with presenting the second portion of the object.

7. The method of claim 1, wherein the first saliency value is a function of a first number of polygons in a first portion of a texture map that corresponds to the first portion of the object and the second saliency value is a function of a second number of polygons in a second portion of the texture map that corresponds to the second portion of the object.

8. The method of claim 1, wherein the first saliency value is a function of a first level of interaction with the first portion of the object and the second saliency value is a function of a second level of interaction with the second portion of the object.

9. The method of claim 1, wherein the first saliency value is a function of a first number of revisions made to the first portion of the object and the second saliency value is a function of a second number of revisions made to the second portion of the object.

10. The method of claim 1, wherein the first saliency value is a function of a first gaze duration associated with the first portion of the object and the second saliency value is a function of a second gaze duration associated with the second portion of the object.

11. The method of claim 1, wherein the first saliency value is a function of a first level of detail associated with the first portion of the object and the second saliency value is a function of a second level of detail associated with the second portion of the object.

12. The method of claim 1, wherein the first saliency value is a function of a first number of colors associated with the first portion of the object and the second saliency value is a function of a second number of colors associated with the second portion of the object.

13. The method of claim 1, wherein the first saliency value is a function of a first resolution associated with the first portion of the object and the second saliency value is a function of a second resolution associated with the second portion of the object.

14. The method of claim 1, wherein the first saliency value is a function of a first amount of movement that the first portion of object is capable of performing and the second saliency value is a function of a second amount of movement that the second portion of the object is capable of performing.

15. The method of claim 1, wherein determining the first saliency value and the second saliency value comprises obtaining a user input indicative of the first saliency value or the second saliency value.

16. The method of claim 1, wherein triggering the presentation comprises associating the object with a saliency map that indicates the first saliency value for the first portion of the object and the second saliency value for the second portion of the object.

17. The method of claim 16, wherein the object includes a plurality of pixels; and
wherein the saliency map includes respective pixel characterization vectors for the plurality of pixels, each pixel characterization vector including a saliency value for a corresponding one of the plurality of pixels.

18. The method of claim 1, wherein triggering the presentation comprises:
triggering display of the first portion of the object with a first pixel density that is a function of the first saliency value; and
triggering display of the second portion of the object with a second pixel density that is a function of the second saliency value.

19. A device comprising:
one or more processors;
a non-transitory memory; and one or more programs stored in the non-transitory memory, which, when executed by the one or more processors, cause the device to:

receive a first user input directed to an object generation environment;

in response to receiving the first user input, generate obtain an object that includes a plurality of portions including a first portion and a second portion;

determine a first saliency value for the first portion of the object and a second saliency value for the second portion of the object;

generate, based on the first and second saliency values, an extended reality (XR) environment object that represents the object, wherein the XR environment object includes a first portion associated with the first portion of the object, and wherein the XR environment object includes a second portion associated with the second portion of the object; and trigger presentation, within an XR environment, of the first portion of the XR environment object in accordance with a first display characteristic that is based on the first saliency value and the second portion of the XR environment object in accordance with a second display characteristic that is based on the second saliency value.

20. A non-transitory memory storing one or more programs, which, when executed by one or more processors of a device, cause the device to:

receive a first user input directed to an object generation environment;

in response to receiving the first user input, generate an object that includes a plurality of portions including a first portion and a second portion;

determine a first saliency value for the first portion of the object and a second saliency value for the second portion of the object;

generate, based on the first and second saliency values, an extended reality (XR) environment object that represents the object, wherein the XR environment object includes a first portion associated with the first portion of the object, and wherein the XR environment object includes a second portion associated with the second portion of the object; and trigger presentation, within an XR environment, of the first portion of the XR environment object in accordance with a first display characteristic that is based on the first saliency value and the second portion of the XR environment object in accordance with a second display characteristic that is based on the second saliency value.

21. The method of claim 1, further comprising receiving a second user input directed to the object generation environment, wherein the second user input specifies a salient portion of the object, and wherein determining the first and second saliency values is based at least in part on the salient portion of the object specified by the second user input.

22. The method of claim 1, wherein at least one of the first and second display characteristics indicates a display resolution or a display refresh rate.

* * * * *